United States Patent [19]
Soderberg et al.

[11] Patent Number: 5,471,567
[45] Date of Patent: Nov. 28, 1995

[54] IMAGE ELEMENT DEPTH BUFFERING USING TWO BUFFERS

[75] Inventors: Brian T. Soderberg, Woodinville; Mark L. Kenworthy, Renton, both of Wash.

[73] Assignee: Bolt Beranek and Newman Inc., Cambridge, Mass.

[21] Appl. No.: 741,999

[22] Filed: Aug. 8, 1991

[51] Int. Cl.$^6$ .................................................. G06T 17/00
[52] U.S. Cl. ........................... 395/133; 395/122; 395/135
[58] Field of Search ................... 395/118–122, 129–132, 395/126–128, 133–135

[56] References Cited

U.S. PATENT DOCUMENTS 5,075,876  12/1991  Seki et al. ................................ 395/121
5,079,698   1/1992  Grenier et al. ...................... 395/132 X

FOREIGN PATENT DOCUMENTS 0310176  5/1989  European Pat. Off. .

OTHER PUBLICATIONS

Franklin C. Crow, "The Aliasing Problem in Computer–Generated Shaded Images"—Communications of the Association For Computer Machinery, vol. 20, No. 11, Nov. 1977, New York, US, pp. 799–805.
European Search Report in corresponding European Patent Application issued by European Patent Office on Oct. 18, 1993.

*Primary Examiner*—Almis R. Jankus
*Attorney, Agent, or Firm*—Henry D. Pahl, Jr.

[57] ABSTRACT

Depth buffered anti-aliasing in a real time image generation system utilizing two separate buffers, one for combining attributes of object pixel definitions which are of less than full coverage and another for storing the attributes of each new object pixel definition which is of full coverage and which is closer to the viewpoint than any attributes currently stored. If the depth value in the partial buffer is closer the viewpoint than that in the full buffer, a set of attributes is output which is a weighted mixture of those stored in the two buffers.

8 Claims, 6 Drawing Sheets

IMAGE ELEMENT DEPTH BUFFERING USING TWO BUFFERS

BACKGROUND OF THE INVENTION

The present invention relates to real time image generation systems of the type used in simulation and interactive training and relates more particularly to a method for anti-aliasing video displays.

In real time image generation systems, it is typically necessary to completely build a new image during each frame interval, e.g. one fifteenth second or less, since such systems preferably permit the free changing of viewpoint in a three-dimensional world and the free changing of the position and orientation of various objects which can be seen from the viewpoint. Real time image generation systems typically operate from a database providing an inventory of objects which can be displayed. The data typically represents each object as a group of three-dimensional polygons in a single size which can then be positioned, scaled and rotated or oriented by applying mathematical transforms. The polygons may, for example, be represented by the locations of vertices. Typically, there is associated with each surface of the polygon a texture map which permits a textured surface to be, in effect, projected on the plane of the polygon thereby to represent a surface.

In building up an image, the various objects within the possible field of view are analyzed sequentially and pixel definitions are output for each screen-space pixel which the object occupies completely or partially. Since it is computationally difficult to order the objects in terms of depth or distance from the viewpoint prior to processing, there is typically provided with each object pixel definition a depth value which represents distance from the viewpoint to the object.

As is understood by those skilled in the art, the objects in the database are typically calculated at a greater precision than the pixel resolution of the video display used to present the constructed image. In other words, an edge of a polygon may pass through and therefore only partially occupy a given pixel. If an object, which only partially covers a pixel is allowed to dominate or completely define a given pixel, e.g. on the basis that it is the closest object, an effect known as aliasing or staircasing may occur in which supposedly straight lines appear jagged because of the graininess of resolution of the video display. It is known that this effect can be ameliorated by mixing contributions from all objects which should properly contribute to what is seen at that pixel position. This is commonly described as anti-aliasing. For this purpose, a weight value is often provided with each object pixel definition which indicates the degree or extent of pixel coverage.

One method of accomplishing the mixing of contributions is to define sub-pixels which represent a finer resolution within the area of each actual pixel and by keeping track of which object attributes should contribute to each sub-pixel. However, in real time systems in which images must be built up multiple times and buffered for each frame interval, the memory requirements for the frame buffers is multiplied severely. For example, to provide a 4 by 4 sub-pixel analysis, the memory requirements would be multiplied sixteen fold. Accordingly, in prior art systems, a composite color and brightness for each pixel has been built up in a single buffer by mixing contributions from each new object with those contributions accumulated previously with each contribution being proportioned in accordance with its respective weight value. This method, however, has demonstrated observable anomalies and bleed-through effects when implemented in a non-ordered depth buffer system.

Among the objects of the present invention may be noted the provision of a real time image generation system which minimizes aliasing effects; the provision of such a system which minimizes bleed-through effects; the provision of such a system which does not require a sub-pixel buffering of pixel display definitions; the provision of such a system which does not require greatly expanded frame buffer memory; the provision of such a method which is highly reliable and which is of relatively simple and inexpensive implementation.

SUMMARY OF THE INVENTION

The method of the present invention is applicable to a real time image generation system in which objects can be defined with greater precision than the pixel resolution of the display and the method operates to combine on a pixel basis contributions from successively presented different objects using first and second buffers. The attributes of each new object pixel definition which is of full pixel coverage and which is closer to the viewpoint than attributes previously considered are stored in the first buffer. The attributes of each new object pixel which is of less than full pixel coverage and is closer to the viewpoint than the attributes stored in said first buffer are combined with any attributes previously stored in the second buffer. If the combined weight of accumulated contributions from partial coverage objects is less than full coverage, the accumulated contributions are stored in the second buffer. If the combined weight of the accumulated contributions equals full coverage (and if the depth is closer to the viewpoint than attributes previously stored in the first buffer), the combined attributes are stored in the first buffer. During display, a set of attributes is output which is a weighted mixture of the attributes in the two buffers if the depth value in the second buffer is closer the viewpoint than the depth value in the first buffer and is equal to those attributes stored in the first buffer if the depth value in the first buffer is closer the viewpoint than the depth value in the second buffer.

BRIEF DESCRIPTION OF THE DRAWINGS

Corresponding reference characters indicate corresponding parts throughout the several views of the drawings.

DESCRIPTION OF THE PREFERRED EMBODIMENT

As indicated previously, real time image generation systems are utilized for simulation and interactive training. Such systems are, for example, used for training combat tank crews in coordinated tactics and strategies. To provide for realistic interactive training, the image generation system must not only permit the position, orientation and perspective of the viewpoint to change in relation to various objects which may be seen but also should permit the free movement and re-orientation of certain objects being viewed. For example, while the participant at one terminal or station may have control of his own position and viewpoint, e.g. by driving his vehicle, the position and orientation of an object in his view, e.g. another vehicle, may be controlled by personnel at a different terminal or station.

Figure 1:
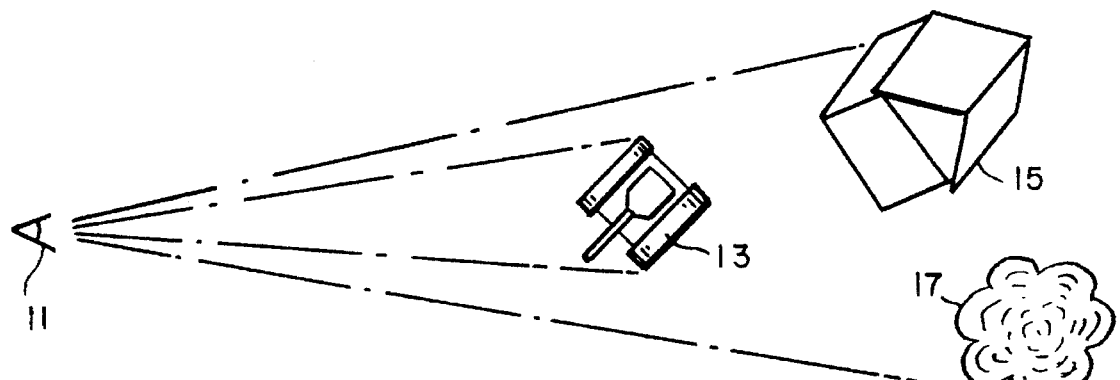
FIG. 1 is a diagram illustrating a viewpoint in the context of an image generation system.

With reference to FIG. 1, the viewpoint, designated by reference character 11, may change in both position and orientation with respect to objects within the field of view, i.e. tank 13, building 15 and tree 17 and, at the same time, the tank 13 may itself move and re-orient itself with respect to the stationary objects. Since this freedom implies that any given pixel may change from frame to frame, it becomes essentially necessary to generate a complete image during each frame interval.

Figure 2:
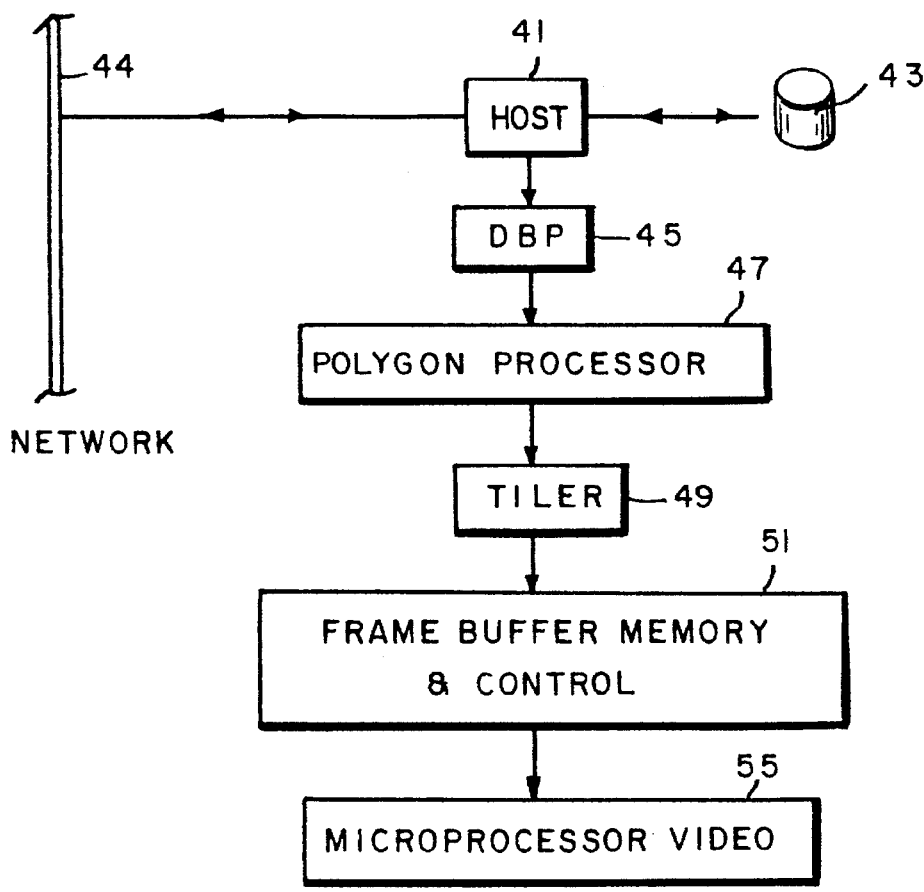
FIG. 2 is a diagram of the architecture for a real time image generation system in which the present invention is useful.

To provide for the repetitive and real time generation of complete images on successive frames, it is usual to employ a combination of general purpose computer systems and dedicated special purpose logic. The general purpose computer systems typically manage the databases of scenes and objects which can be displayed in those scenes and the special purpose hardware accepts re-oriented polygon definitions and texture maps from the general processor computer apparatus and generates definitions for surfaces and for individual pixels. A typical real time image generation system of this character is illustrated in FIG. 2. This system may, for example, be the GT100D visual system as manufactured and sold by the Systems and Technologies Division of Bolt Beranek and Newman in Cambridge, Mass. The embodiment of the present invention being disclosed herein is an improvement in that existing system.

With reference to FIG. 2, the general purpose processing system which manages the training programs and the databases of scenes and displayable objects is indicated generally by reference character 41. Typically, a Winchester type hard disk drive 43 is provided for storing database information and programs. Multiple visual systems may be linked through a data network as indicated at 44.

The database is traversed and processed by the database processor 45. The polygons which are used to make up the various displayable objects may, for example, be stored in the database in the form of vertex and attribute information as referenced earlier. This vertex information is then converted to a more complete polygon definition by polygon processer 47. Information provided by the database processor 45 is, in turn, processed by a polygon processor 47 which generates definitions of individual surfaces. Colors and/or textures can then be applied to the individual surfaces by dedicated circuitry 49 which is conventionally referred to as a tiler. As successive objects within the field of view are processed, the tiler outputs corresponding pixel definitions for each pixel which can be affected by that object. The pixel definitions includes both color and brightness information, a depth value which represents distance from the viewpoint, and a weight value which indicates the degree of pixel coverage. The pixel definitions provided by the tiler for successive objects are combined and accumulated in a frame buffer memory system designated generally by reference character 51. During the display of a given frame or image, corresponding buffer memory locations are successively read out by a microprocessor video controller 55. As is conventional, the frame buffer memory system 51 provides for double buffering, that is, two sections of memory are provided and one section is used to build up a new image for the next frame while the other section is being read out by the video processor 55. Each memory section in the prior art system, however, constitutes a single buffer whereas, in accordance with the present invention, each section implements two buffers, a so-called partial buffer and a so-called full buffer.

In the prior art GT100D system, data defining successive object pixels was accumulated in the single memory buffer according to an algorithm which summed partial pixel contributions until full coverage was reached and which used the depth value for the nearest contributing object as the depth value for the accumulated attributes. Once the weight value accumulated corresponded to full coverage, the information in the buffer would be replaced only if a subsequent object was nearer. If a subsequent nearer object was of less than full coverage, the new and stored parameters were combined using the new weight for its color and full minus the new weight for the previous color value.

As indicated previously, the requirements of real time processing make depth ordering of successive objects being presented impractical and it has been found in practice that this prior art algorithm allowed some perceptible bleed through effects. These bleed through effects apparently stemmed from situations in which two nearer partial coverage contributions should completely obscure an earlier full coverage contribution but, in fact, some significant effect persisted from the earlier full coverage contributor due to the mixing nature of the algorithm used.

In accordance with the practice of the present invention, such bleed through problems and other anomalous effects are substantially eliminated by utilizing two buffers for each frame to be buffered. One of these buffers is referred to hereinafter as the partial buffer and the other is referred to as the full buffer. It should be understood, however, that double buffering will also typically be provided in the sense that there will be two sets of full and partial buffers, one for the current frame being built up and another for a previously built up frame currently being read out to the video processor 55.

Figure 3:
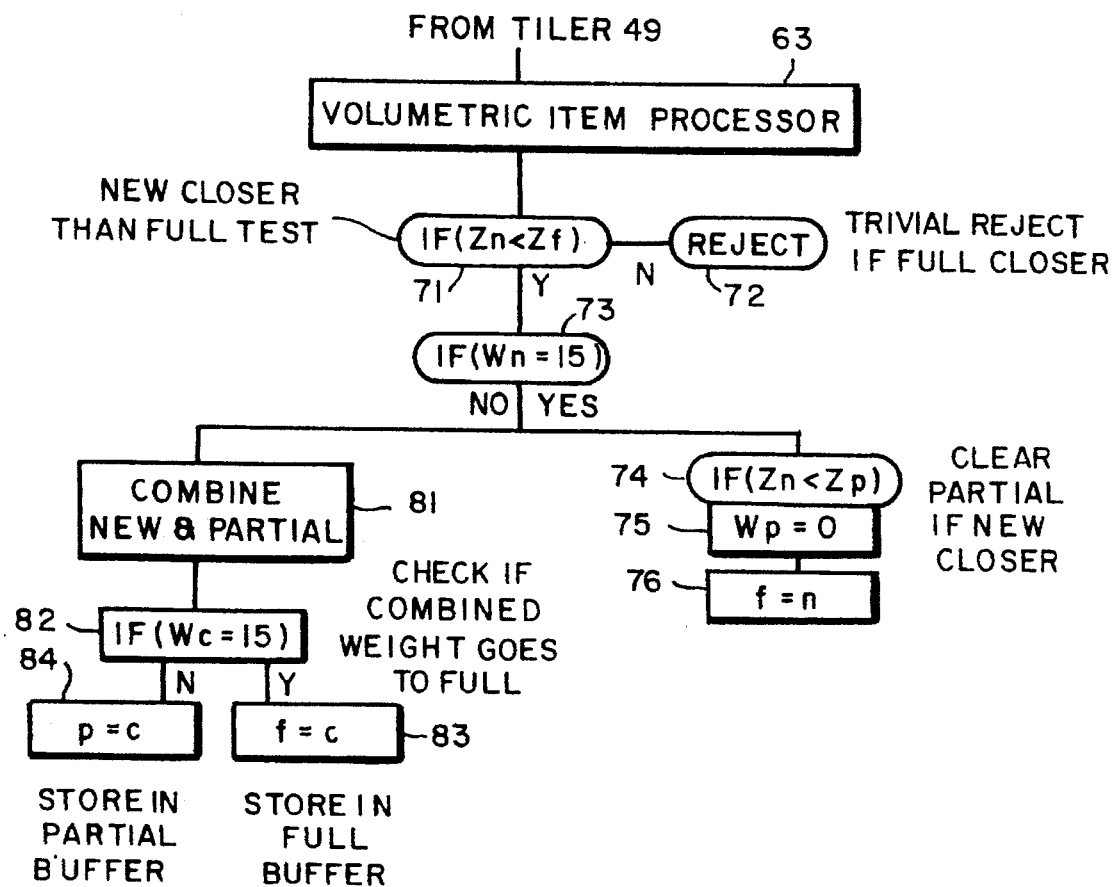
FIG. 3 is a block diagram of logic for controlling the flow of data in loading first and second buffers in accordance with the practice of the present invention.
Figure 3:
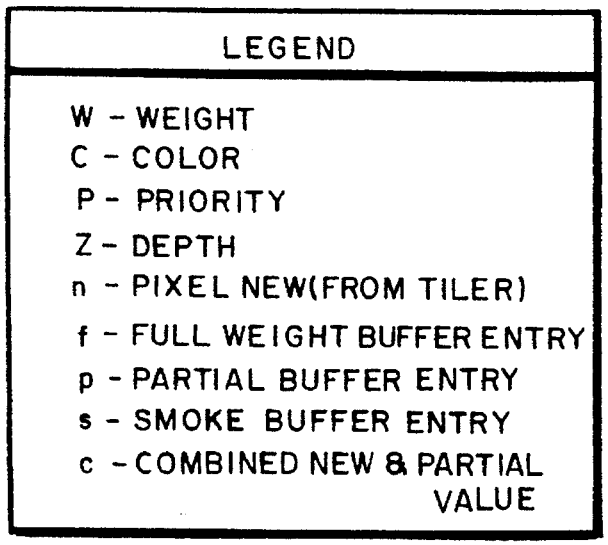

The overall flow of data in loading the full and partial buffers is illustrated in FIG. 3. In a preferred embodiment of the present invention, the buffer data control circuitry receives pixel data from the tiler 49 through circuitry, designated by reference character 63, which can apply haze or smoke effects to the pixels being presented. The buffer control circuitry could, however, receive data essentially directly from the tiler. The smoke and haze circuitry 63 is the subject of a separate, co-assigned patent application entitled "Volumetric Effects Pixel Processing" which is being filed of even date with the present application. The disclosure of said copending application is incorporated herein by reference.

In general, the buffer control circuitry compares values which characterize or define each incoming pixel definition with corresponding values which may already be stored in the partial and full buffer locations for that pixel and, based on those comparisons, determines whether the data in the buffers should be updated and with what data. The data being presented to the buffer control circuitry 51 includes a 16-bit depth value (Z), a three-bit priority value (P) which can be used resolving certain depth ambiguities, four-bit values (R, G & B) for each of the primary colors red, green and blue, and a four-bit weight value (W) which, as described previously, indicates the degree of coverage of the pixel by the new object being presented. A channel designation signal and values associated with the smoke and haze circuitry may also be present but are not of concern with respect to the present invention. As indicated previously, the control circuitry performs various comparisons of values defining the new pixel with corresponding values stored in the full and partial buffers. Suffixes applied to the values indicate their source, i.e. "n" indicates the value is from the new pixel; "p" indicates the value from the partial buffer; and "f" indicates a value from the full buffer.

In general, the operation of the buffer memory control circuitry is as follows. If there is data in the full buffer and it is closer to the viewpoint than the new object, the data representing the new object is simply ignored. This test is indicated at blocks 71 and 72. If the weight of the new object pixel definition indicates full coverage, i.e. Wn=15, a full buffer operation is initiated. The test is indicated at block 73. If the new data is closer the viewpoint than that already in the partial buffer, i.e. if Zn less than Zp, the partial buffer is cleared (block 75) and the new data replaces the old data in the full buffer as indicated at block 76.

On the other hand, if only partial coverage is provided by the new object, the values characterizing the new object are combined with those already in the partial buffer as indicated generally at block 81. The two partial contributions are combined in accordance with the respective weights as described in greater detail hereinafter. If the combined weight of the previous and new contributions is equivalent to full coverage as tested at block 82, the combined characteristics are stored in the full buffer as indicated at block 83. If the combined weight does not equal full, the new mixed data replaces that previously in the partial buffer as indicated at block 84. Because of the previous test at block 71 and the manner of combining new and stored partial coverage pixel data, it is already known that the new combined pixel will be nearer to the viewpoint than the data existing in the full buffer.

Figure 4:
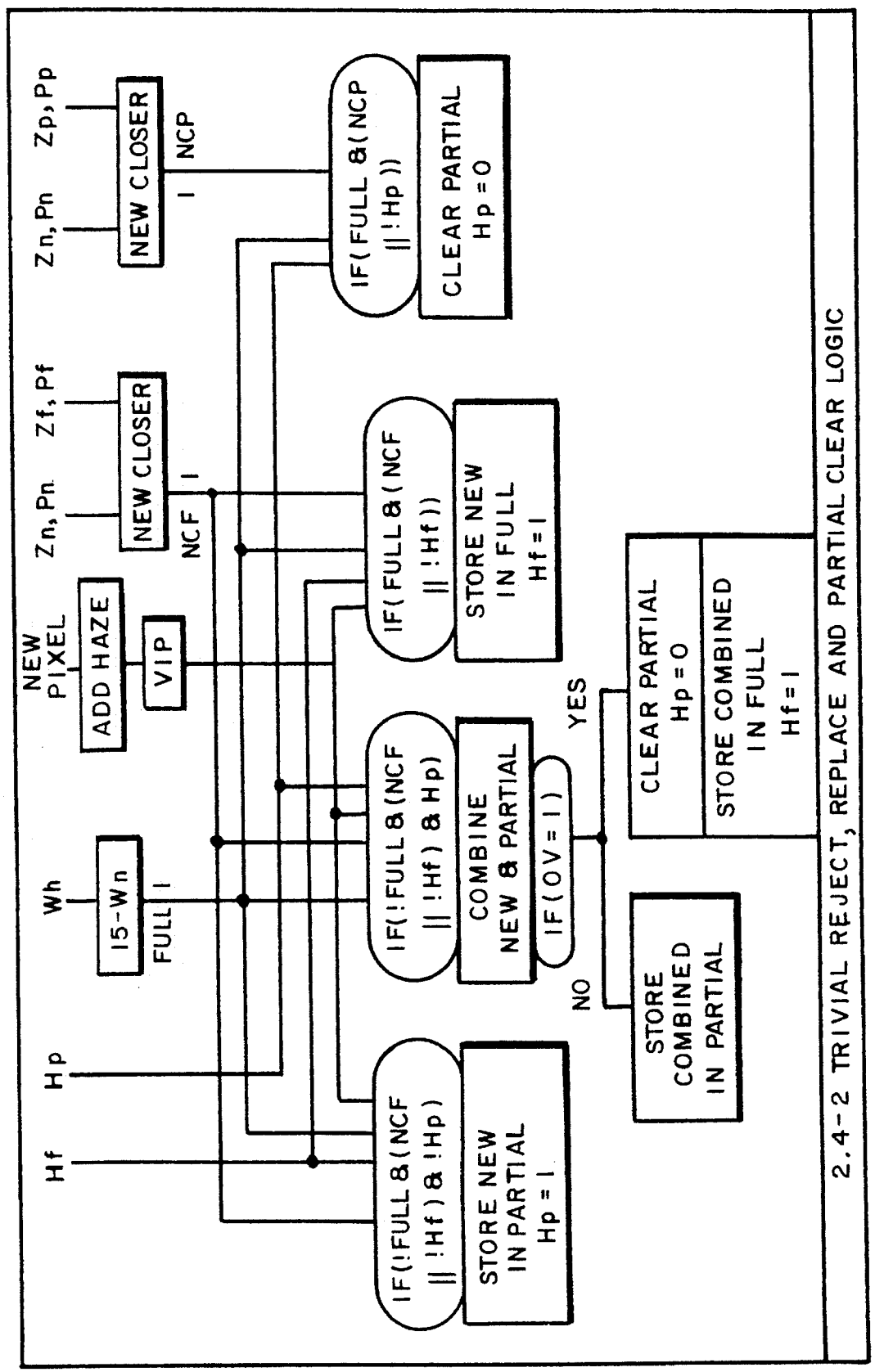
FIGS. 4–8 illustrate in greater detail logic which is incorporated in the system of FIG. 3.
Figure 6:
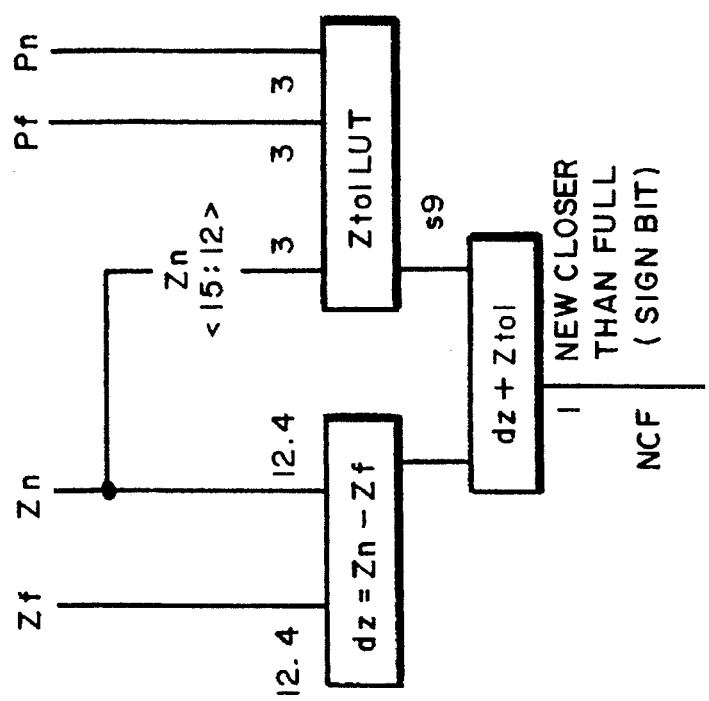
Figure 5:
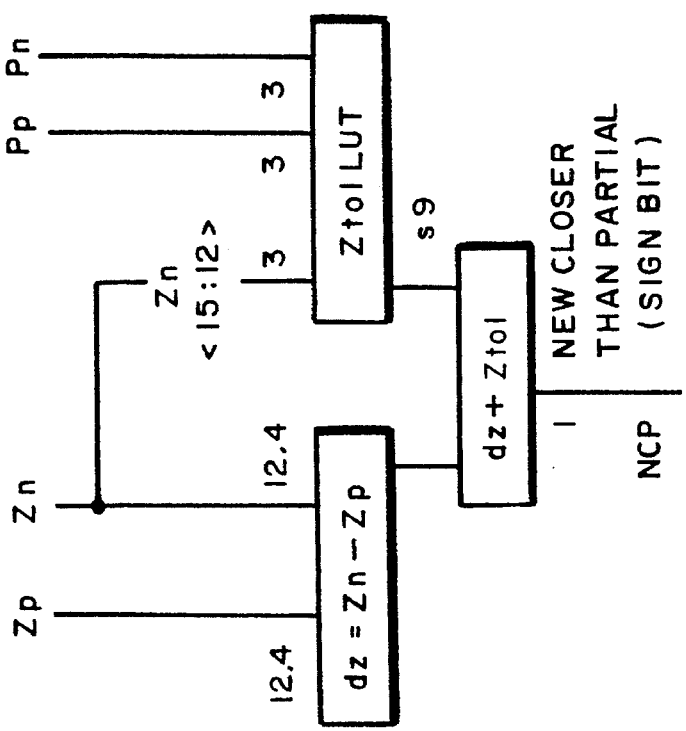

While the foregoing description of the present invention is believed to be enabling to those skilled in the art, a more detailed illustration of the logical functions implemented by the blocks of FIG. 3 are presented in FIGS. 4 through 6.

The logical functions performed in rejecting new pixels more distant than the contents of the full buffer and in effecting the replacement and clearing of values in the buffers are illustrated in greater detail in FIG. 4. The new closer than partial and new closer than full tests which are incorporated in FIG. 4 are in turn illustrated in greater detail in FIGS. 5 and 6 respectively. The algorithm performed by this circuitry generally takes the depth values (distance from viewer to object at the pixel) for the new and stored entry and subtracts them. The priorities of the two pixels are then used to look up a depth tolerance in a look up table (LUT) to allow for the co-planar surface resolution and to place certain specific objects in front of others. The depth tolerance is added to the depth difference resulting in a sign bit which is used for hidden surface elimination.

Figure 7:
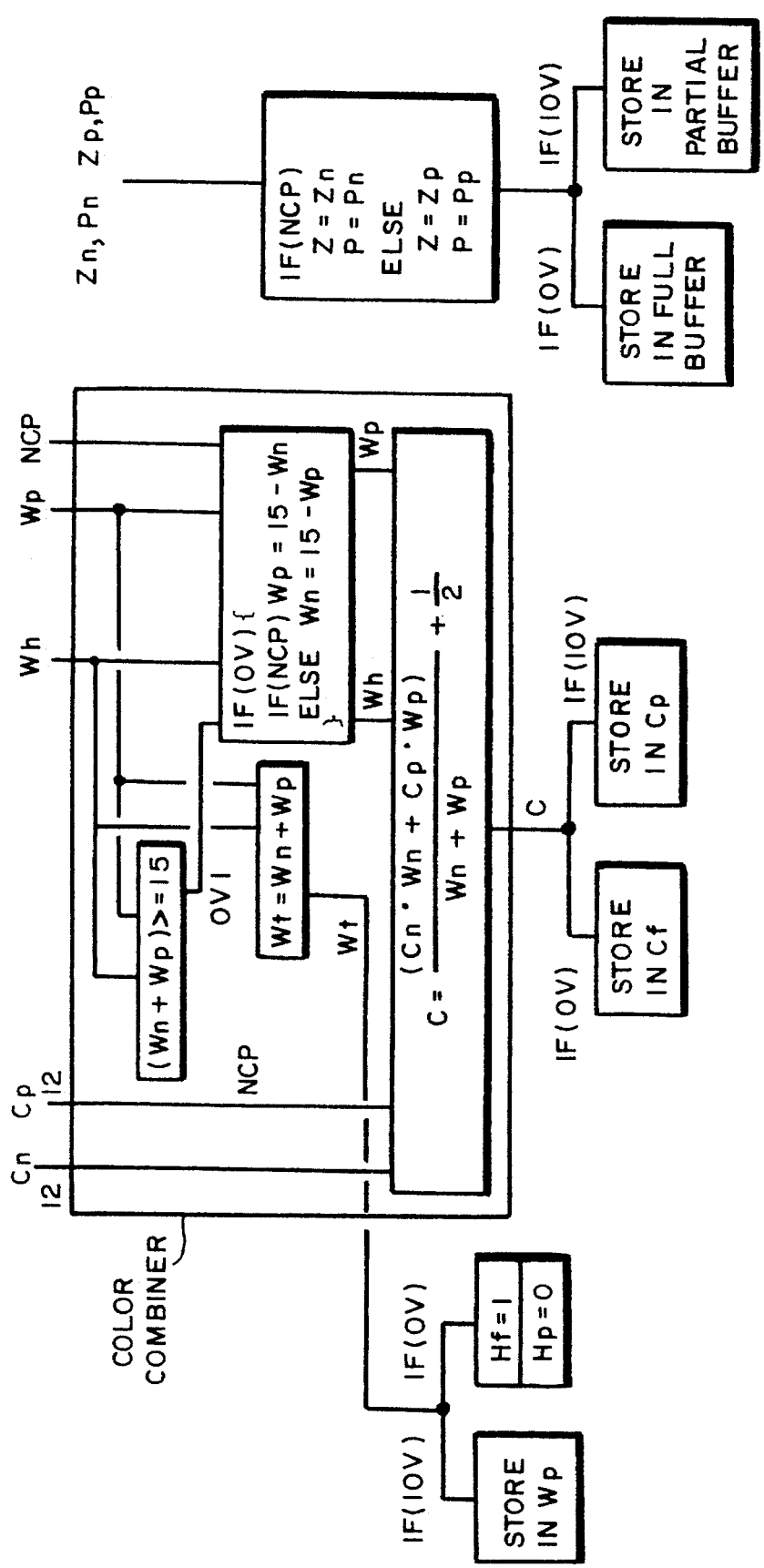

The logic for the combining of new and stored partial pixel definitions (block 81 in FIG. 3) is illustrated in greater detail in FIG. 7. First, the proper color weights for the new and partial entries are determined. They are either their existing weight value or 15—the other weight value depending on the weight total (Wn+Wp) and the "New Closer Than Partial Flag" (NCP). For example if NCP is true and (Wn+Wp)≧15 (OV=True) then Wn is used and Wp is equal to 15—Wn, using only the leftover pixel weight for the more distant partial pixel. If NCP is False (partial entry closer than new) and OV=False (Wn+Wp)<15) then Wp is used for the partial weight and Wn is used for the new weight. The resulting Wn and Wp weights are used to mix the colors in the combine color function. The resulting color C is stored in the full buffer if OV is true, otherwise stored in partial buffer.

The resulting weight, Wt, is stored in the partial buffer if OV is False, otherwise if OV is True, the FULL control bit (Hf) is set in the full buffer and the Partial control bit (Hp) is cleared in the partial buffer.

If NCP is True and OV is True, the new depth and priority are stored in the full buffer. If NCP is True and OV is False, the new depth and priority are stored in the partial buffer. If NCP is False and OV is True, the existing partial buffer depth and priority are stored in the full buffer. If NCP is False and OV is False, the partial buffer depth and priority remain unchanged.

Figure 8:
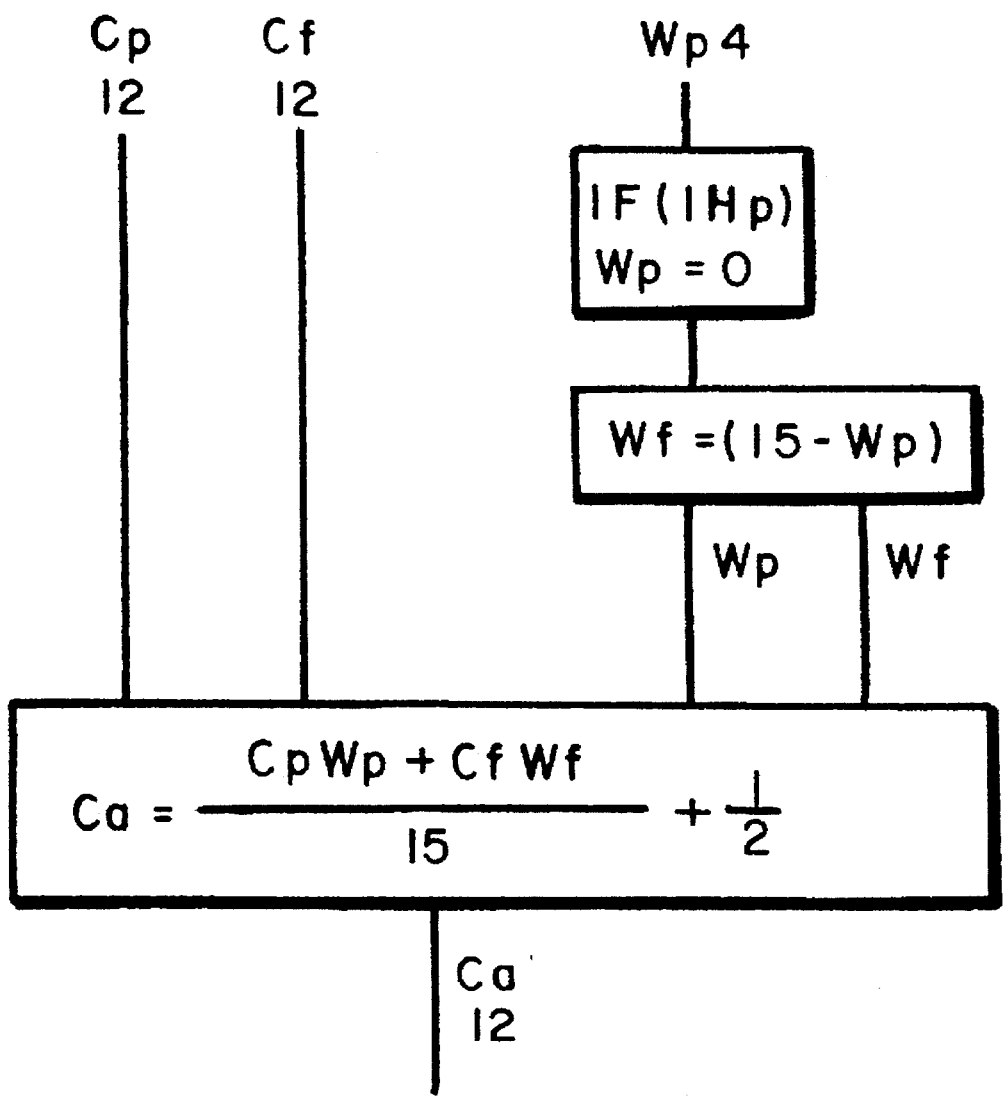

After all objects in the field of view have been analyzed and the contents of the partial and full buffers for each pixel have been built up as described, the contents of these buffers are combined on a weighted basis. The logic for this combination is illustrated in FIG. 8.

While the method and architecture of the present invention require only an effective doubling of the amount of memory required for frame buffering, it has been found that the invention will substantially eliminate bleed through problems and other anomalous effects in a manner entirely comparable to so-called sub-pixel analysis. As indicated previously, the combined output from the partial and full buffers may also be combined with certain smoke, sky or other volumetric effects to generate a final output pixel definition which is used in driving the display device.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a real time image generation system operating from a database in which objects can be defined with greater precision than the pixel resolution of the display and in which a weight value is provided with each object pixel definition which indicates the degree of pixel coverage and a depth value is provided which represents distance from viewpoint, the method of combining on a pixel basis contributions from successively presented different objects using first and second buffers; said method comprising:

inputting a succession of object pixels defined by respective attributes including said weight value and said depth value;

storing in a first buffer the attributes of each new object pixel definition whose weight value represents full coverage and whose depth value represents a position closer to the viewpoint than attributes currently stored in said first buffer;

combining contributions weighted in accordance with respective weight values from:
(i) the attributes of each new object pixel definition whose weight value represents less than full coverage and whose depth value represents a position closer to the viewpoint than attributes currently stored in said first buffer, and
(ii) any attributes previously stored in said second buffer if the combined weight of the combined contributions is less than full coverage, storing the combined contributions in said second buffer;

if the combined weight of the combined contributions equals full coverage and if the depth value represents a position closer the viewpoint than attributes stored in said first buffer, storing the combined attributes in said first buffer; and outputting a pixel definition defined by a set of attributes which is a mixture, weighted in accordance with respective weight values, of the attributes in the two buffers if the depth value in the second buffer is closer the viewpoint than the depth value in the first buffer and is equal to those attributes stored in said first buffer if the depth value in the first buffer is closer the viewpoint than the depth value in the second buffer.

2. The method as set forth in claim 1 wherein the attributes of each new pixel definition include color and new and stored color attributes are combined in proportion to respective weight values.

3. The method as set forth in claim 2 wherein the depth value stored in said second buffer is the nearer to the viewpoint of the respective new object definition and any attributes currently stored in said second buffer.

4. The method as set forth in claim 2 wherein the weight values of successively presented pixel definitions of less than full coverage are cumulated in said second buffer.

5. In a real time image generation system operating from a database in which objects can be defined with greater precision than the pixel resolution of the display and with attributes for each pixel which include color and a weight value which indicates the degree of pixel coverage and a depth value is provided which represents distance from viewpoint, the method of combining on a pixel basis contributions from successively presented unordered different objects using first and second buffers; said method comprising:

reading successive object pixel definitions;

storing in a first buffer the attributes of each new object pixel definition which is of full coverage and which is closer to the viewpoint than attributes currently stored in said first buffer;

combining weighted contributions from:
(i) the attributes of each new object pixel definition which is of less than full coverage and which is closer to the viewpoint than attributes currently stored in said first buffer, and
(ii) any attributes previously stored in said second buffer the color attributes being combined in proportion to the respective weight values and the weights being cumulated;

if the combined weight of accumulated contributions is less than full coverage, storing the accumulated contributions in said second buffer;

if the combined weight of the accumulated contributions equals full coverage, storing the combined attributes in said first buffer; and outputting a set of attributes which is a weighted mixture of the attributes in the two buffers if the depth value in the second buffer is closer the viewpoint than the depth value in the first buffer and is equal to those attributes stored in said first buffer if the depth value in the first buffer is closer the viewpoint than the depth value in the second buffer.

6. The method as set forth in claim 5 wherein the depth value stored in said second buffer is the nearer to the viewpoint of the respective new object definition and any attributes currently stored in said second buffer.

7. In a real time image generation system operating from a database in which objects can be defined with greater precision than the pixel resolution of the display and in which a weight value is provided with each object pixel definition which indicates the degree of pixel coverage and a depth value is provided which represents distance from viewpoint, the method of combining on a pixel basis contributions from successively presented different non-ordered objects using first and second buffers; said method comprising:

as successive object pixel definitions are provided, storing in a first buffer the attributes of each new object pixel definition which is of full coverage and which is closer to the viewpoint than attributes currently stored in said first buffer;

combining weighted contributions from:
(i) the attributes of each new object pixel definition which is of less than full coverage and which is closer the viewpoint than attributes currently stored in said first buffer, and
(ii) any attributes currently stored in said second buffer storing the accumulated contributions in said second buffer; and outputting a set of attributes which is a weighted mixture of the attributes in the two buffers if the depth value in the second buffer is closer the viewpoint than the depth value in the first buffer.

8. In a real time image generation system operating from a database in which objects can be defined with greater precision than the pixel resolution of the display and in which a weight value is provided with each object pixel definition which indicates the degree of pixel coverage and a depth value is provided which represents distance from viewpoint, apparatus for combining on a pixel basis contributions from successively presented different objects; said apparatus comprising:

first and second frame buffers;

means for storing in said first buffer, as successive object pixel definitions are read, the attributes of each new object pixel definition which is of full coverage and which is closer the viewpoint than attributes currently stored in said first buffer;

means for combining weighted contributions from:
(i) the attributes of each new object pixel definition which is of less than full coverage and which is closer the viewpoint than attributes currently stored in said first buffer, and
(ii) any attributes previously stored in said second buffer means for storing in said second buffer the accumulated contributions if the combined weight of accumulated contributions is less than full coverage;

means for storing the combined attributes in said first buffer if the combined weight of the accumulated contributions equals full coverage and if the depth is closer the viewpoint than attributes stored in said first buffer; and means for outputting a set of attributes which is a weighted mixture of the attributes in the two buffers if the depth value in the second buffer is closer the viewpoint than the depth value in the first buffer and is equal to those attributes stored in said first buffer if the depth value in the first buffer is closer the viewpoint than the depth value in the second buffer.

* * * * *